United States Patent [19]

Karasaki

[11] Patent Number: 4,857,720

[45] Date of Patent: Aug. 15, 1989

[54] FOCUS DETECTING SYSTEM USING MULTIPLE PORTIONS OF THE IMAGE TO BE FOCUSSED

[75] Inventor: Toshihiko Karasaki, Sakai, Japan

[73] Assignee: Minolta Camera Kabushiki Kaisha, Osaka, Japan

[21] Appl. No.: 289,513

[22] Filed: Dec. 27, 1988

Related U.S. Application Data

[63] Continuation of Ser. No. 65,904, Jun. 24, 1987, abandoned.

[51] Int. Cl.$^4$ ............................................. G01J 1/20
[52] U.S. Cl. .................................... 250/201; 354/408
[58] Field of Search .................... 250/201 R, 201 PF; 354/406, 407, 408

[56] References Cited

U.S. PATENT DOCUMENTS

| | | | |
|---|---|---|---|
| 4,373,791 | 2/1983 | Araki | 354/25 |
| 4,560,863 | 12/1985 | Matsumura et al. | 250/201 |
| 4,563,576 | 1/1986 | Matsumua et al. | 250/204 |
| 4,739,158 | 4/1988 | Kato | 250/201 |

Primary Examiner—David C. Nelms
Assistant Examiner—William L. Oen
Attorney, Agent, or Firm—Burns, Doane, Swecker & Mathis

[57] ABSTRACT

A focus detecting system which comprises photoelectric transducer element arrays for sensing standard and reference light fluxes which have passed respectively through different areas of an exit pupil of a photo-taking lens. The photoelectric transducer element arrays are comprised of a plurality of photoelectric transducer element arrays different in at least position or direction, some of the photoelectric transducer element arrays being arranged at a position containing the optical axis of the photo-taking lens whereas the remaining photoelectric transducer element arrays are arranged at a position which does not contain the optical axis. The direction of the photoelectric transducer element arrays is substantially perpendicular to the imaginary line which is drawn to connect between the optical axis and the position at which the photoelectric transducer element arrays outside the optical axis are arranged.

3 Claims, 3 Drawing Sheets

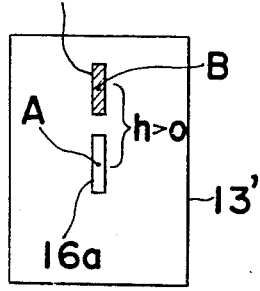

FOCUS DETECTING SYSTEM USING MULTIPLE PORTIONS OF THE IMAGE TO BE FOCUSSED BACKGROUND OF THE INVENTION

This application is a continuation of application Ser. No. 065,904, filed June 24, 1987, now abandoned.

1. (Field of the Invention)

The present nnvention relates to a focus detecting system capable of achieving a so-called multi-point focus detection.

2. (Description of the Prior Art)

U.S. Pat. No. 4,636,624 issued in Jan. 13, 1987 discloses such a focus detecting system as shown in FIG. 7 of the accompanying drawings. Referring to FIG. 7, the prior art focus detecting system shown therein includes a condenser lens 3 positioned rearwardly of a photo-taking lens 2 on an optical axis 1, a pair of image forming lenses 4a and 4b positioned rearwardly of the condenser lens 3 and arranged in a symmetrical relationship with each other relative to the optical axis 1, and a pair of line sensors (arrays of photoelectric transducer elements) 5a and 5b arranged on an image forming plane of the image forming lenses 4a and 4b. Reference numeral 6 represents a plane equivalent to a surface of a film to be exposed, and reference numeral 7 represents a correlation detector electrically connected with the line sensors 5a and 5b.

A standard light flux a and a reference light flux b passing respectively through different areas 2a and 2b of an exit pupil of the photo-taking lens 2 are sensed by the associated line sensors 5a and 5b which convert patterns of distribution of light into respective electric signals, said electric signals being in turn applied to the correlation detector 7 to determine the correlation in position between the images formed on the associated line sensors 5a and 5b for carrying out an automatic focus detection. The correlation detector 7 subsequently generates a defocus signal which is utilized to move the photo-taking lens 2 back and forth by means of a drive mechanism for the purpose of an automatic focus adjustment.

According to the prior art, since the line sensors 5a and 5b are merely oriented horizontally relative to the photo-taking lens 2 at a position containing the optical axis 1, it has been found that the automatic focus detection of, for example, a horizontal line is impossible.

SUMMARY OF THE INVENTION

The present invention has been devised with a view to substantially eliminating the above discussed problem and has for its essential object to provide an improved focus detecting system capable of accomplishing not only a focus detection in the horizontal direction, but also a focus detection in the vertical direction so that an automatic focus detection of, for example, a horizontal line can be accomplished.

In order to accomplish the above described object, the present invention is directed to a focus detecting system of a type wherein for the purpose of the focus detection photoelectric transducer element arrays are used to sense the standard light flux and the reference light flux which have passed respectively through the different areas of the exit pupil of the photo-taking lens. In accordance with the present invention, the photoelectric transducer element arrays are comprised of a plurality of photoelectric transducer element arrays different in at least position or direction, some of the photoelectric transducer element arrays being arranged at a position containing the optical axis whereas others of the photoelectric transducer element arrays are arranged at a position not containing the optical axis, the directions thereof being substantially perpendicular with respect to the imaginary line which is drawn to connect between the optical axis and the position at which the photoelectric transducer element arrays outside the optical axis are arranged.

BRIEF DESCRIPTION OF THE DRAWINGS

This and other objects and features of the present invention will become clear from the following description taken in conjunction with preferred embodiments thereof with reference to the accompanying drawings, in which:

FIG. 3 is a perspective view of the focus detecting system wherein a line sensor is arranged horizontally;

FIG. 4(a) is a front elevational view of a film equivalent plane shown in FIG. 3;

FIG. 4(b) is a front elevational view showing a deviation of the line sensor relative to an odd-shaped opening of FIG. 3;

FIG. 5 is a perspective view of the focus detecting system wherein a line sensor is arranged vertically;

FIG. 6(a) is a front elevational view of the film equivalent plane of FIG. 5;

FIG. 6(b) is a front elevational view showing a deviation of the line sensor relative to an odd-shaped opening of FIG. 5;

DETAILED DESCRIPTION OF THE EMBODIMENTS

Figure 1:
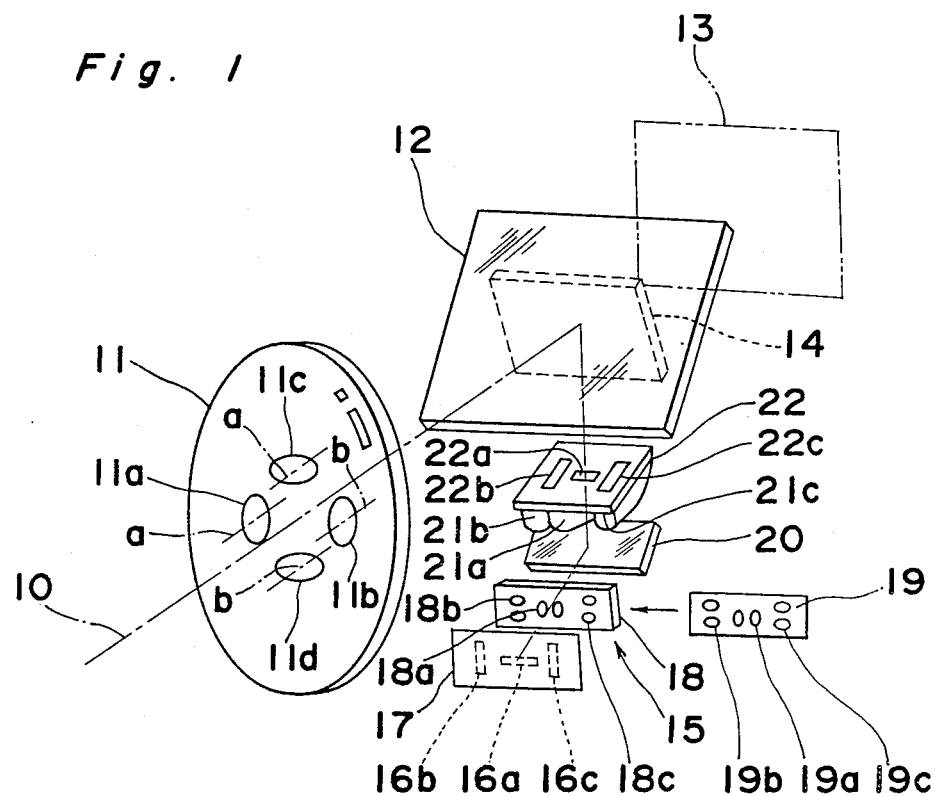
FIG. 1 is a perspective view of an focus detecting system according to the present invention.

Referring now to FIG. 1, a single lens reflex camera is provided with a photo-taking lens 11 having an optical axis 10, a main mirror 12 positioned rearwardly of the photo-taking lens 11 and a film exposing plane 13 positioned rearwardly of the main mirror 12, an objective light flux which has passed through the photo-taking lens 11 being reflected by the main mirror 12 so as to travel upwardly towards a finder optical system (not shown).

The main mirror 12 has at least a portion thereof formed as a semitransparent mirror portion, and an auxiliary mirror 14 is arranged between the semitransparent mirror portion of the main mirror 12 and the film exposing plane 13 for reflecting a focus detecting light flux, which has passed through the semitransparent mirror portion of the main mirror 12, so as to travel downwards toward a focus detecting device 15.

During the actual photo-taking, both of the main mirror 12 and the auxiliary mirror 14 are swung upwardly so as to retract out of the optical axis 10, permitting the objective light flux having passed through the photo-taking lens 11 to fall on the film exposing plane 13 so that the latter 13 can be exposed.

The focus detecting device 15 is provided with a sensor substrate 17 carrying line sensors (arrays of photoelectric transducer elements) 16a, 16b and 16c which may be, for example, charge-coupled devices. Of these line sensors, the line sensor 16a is arranged in a horizontal position containing the optical axis 10, and the remaining line sensors 16b and 16c are arranged on respective sides of the line sensor 16a in respective vertical positions each not containing the optical axis 10. The line sensors 16b and 16c are laid at about 90° relative to the line sensor 16a.

A separator lens plate 18 integrally formed with separator lenses 18a, 18b and 18c corresponding respectively to the line sensors 16a, 16b and 16c is positioned frontwardly of the sensor substrate 17.

An aperture mask 19 is disposed in front of the separator lens plate 18, which mask 19 is formed with apertures 19a, 19b and 19c corresponding respectively to the separator lenses 18a, 18b and 18c. Between the auxiliary mirror 14 and the aperture mask 19 is disposed a reflecting mirror 20 for reflecting and guiding the focus detecting light flux, which has been reflected by the auxiliary mirror 14 so as to travel downward, towards the line sensors 16a to 16c through the apertures 19a to 19c of the aperture mask 19 and then through the separator lenses 18a to 18c.

Positioned between the reflecting mirror 20 and the auxiliary mirror 14 is condenser lenses 21a, 21b and 21c confronting the apertures 19a to 19c of the aperture mask 19, and a field mask 22 having openings 22a, 22b and 22c for separating the focus detecting light flux so as to coordinate respectively with the line sensors 16a to 16c having different positions and directions is disposed above respective upper surface of the condenser lenses 21a to 21c.

Figure 7:
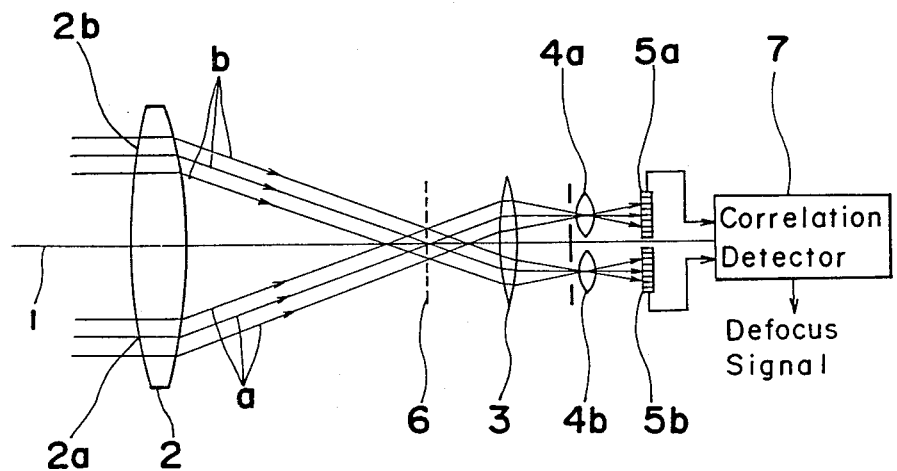
FIG. 7 is a side view of the prior art focus detecting system.

In this construction, as is the case with the prior art system shown in FIG. 7, standard light fluxes a and reference light fluxes b passing through different areas 11a, 11b and 11c, 11d of the exist pupil of the photo-taking lens 11 are received by the individual line sensors 16a to 16c, which line sensors subsequently convert patterns of distribution of light of respective images into associated electric singals which are then supplied to the correlation detector. The correlation detector then determines the correlation of these output signals from the line sensors 16a to 16c for the focus detection and subsequently outputs to a lens drive mechanism a defocus signal necessary to cause the lens drive mechanism to move the photo-taking lens 11 back and forth for the focus adjustment.

According to the prior art shown in and described with reference to FIG. 7, only the line sensors 5a and 5b which correspond to the line sensor 16a arranged in the horizontal position according to the present invention are employed and, therefore, no automatic focus detection of, for example, a horizontal line has been possible. In contrast thereto, according to the illustrated embodiment of the present invention, since in addition to the line sensor 16a in the horizontal position the line sensors 16b and 16c arranged in the vertical position are employed as shown, focus detection in both of the horizontal and vertical direction can be achieved simultaneously and, therefore, the focus detection of, for example, the horizontal line is possible.

While the line sensor 16a poses no problem because it has a predetermined length enough to contain the optical axis 10, each of the line sensors 16b and 16c is located in the vertical position which does not contain the optical axis 10, and, therefore, it is important due to consideration of various interchangeable lens that the respective line sensor 16b or 16c has to be disposed at such a location where no vignetting of the focus detecting light flux occur, that is, at such a location where the amount of margin of the pupil can be maximized.

Figure 2:
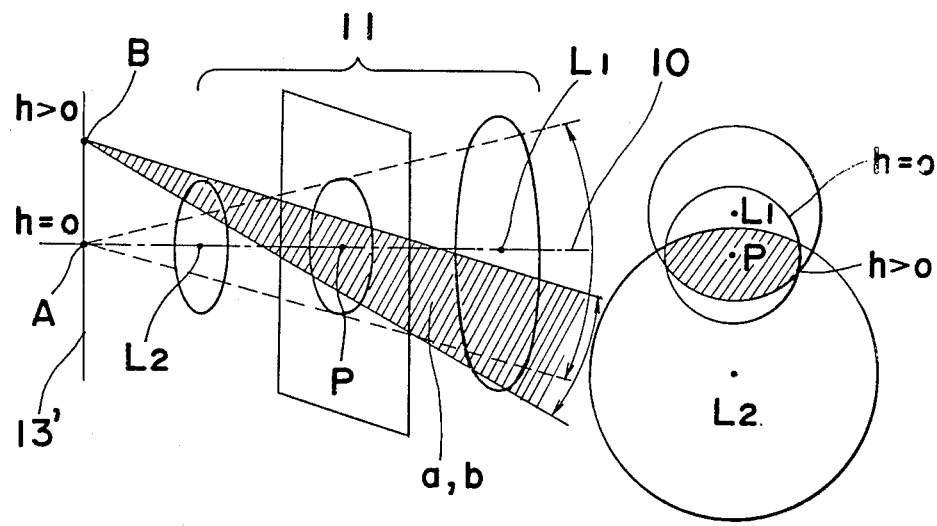
FIG. 2 is a diagram showing a condition in which a light flux for the focus detection is vignetted.

FIG. 2 illustrates an example of how the light flux projected through the photo-taking lens 11 onto a point on the film equivalent plane 13' on the optical axis 10 varies with change in height of the image. As this figure makes it clear, although the light flux incident upon a point A on the film equivalent plane 13' which intersects the optical axis 10 is restricted by an aperture opening P (the circle shown by h=0), but the light flux incident upon a point B lying off the optical axis 10 is restricted by plural openings $L_2$, P and $L_l$ of the photo-taking lens 11 (the odd-shaped opening shown by h>0) such as represented by a shaded area in FIG. 2.

The odd-shaped opening h>0 decreases with increase in distance between the point B from the optical axis along the film equivalent plane 13' and becomes small relative to the direction of deviation of the point B, but will not be affected so much relative to a direction perpendicular to the direction of deviation and, therefore, does not become small.

When any one of the line sensors 16b and 16c, for example, the line sensor 16b, is arranged at the point B which does not contain the optical axis 10, where the respective line sensor 16b or 16c is arranged at the point A in the same direction as the line sensor 16a in the horizontal position, that is, in the horizontal position, as showing in FIG. 3, and in the event that, when as shown in FIGS. 4(a) and 4(b) the position and the angle of the focus detecting device 15 which is fabricated into a module are adjusted relative to the photo-taking lens 11, both of the standard light flux a and the reference light flux b deviate from a normal position (shown by the sold line) by a certain amount Δ on the plane of the pupil (shown by the phantom line) because of the insufficient adjustment, the light flux is susceptible to the vignetting with respect to the horizontal direction and, therefore, the strict adjustment is required.

On the contrary thereto, when the line sensor 16b or 16c is arranged at the point A at an angle of about 90° relative to the line sensor 16a in the horizontal position, that is, in the vertical position as shown in FIG. 5, both of the standard light flux a and the reference light flux b deviate from a normal position (shown by the solid line) by a certain amount Δ on the plane of the pupil (shown by the phantom line) as shown in FIGS. 6(a) and 6(b) such that the vignetting of the light flux in both of the horizontal and vertical directions may occur hardly and, therefore, the moderate adjustment is sufficient.

Accordingly, where the line sensors 16b and 16c are to be arranged at the point B which does not contain the optical axis 10, it is an optimum condition that the line sensors 16b and 16c be arranged in the vertical position relative to the line sensor 16a in the horizontal position as shown in FIG. 5 and FIGS. 6(a) and 6(b).

As a method for carrying out a focus adjustment of the photo-taking lens according to the output from each of the line sensors 16a to 16c, there are some methods, one of which is to effect the focus adjustment on the basis of an output from one of the line sensors which has exhibited the highest contrast of all of the contrasts of the respective images, formed on the associated line sensors, which contrasts are detected according to the outputs from the associated line sensors. Another method is to effect the focus adjustment according to the output from one of the line sensors which detects the target object closest to the camera.

Figure 8:
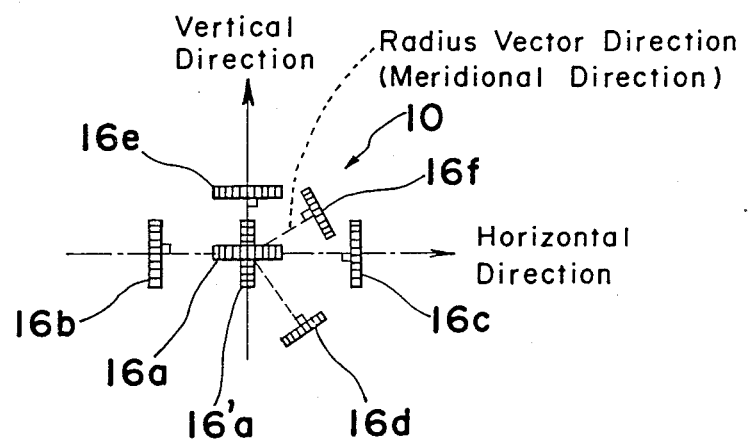
FIG. 8 is a diagram showing a modification of FIG. 1.

Although in the foregoing description the line sensor which contains the optical axis has been described and shown as disposed in the horizontal position for the purpose of brevity, restriction of the direction of the line sensor containing the optical axis relative to the vignetting would not pose any problem so far as the pupil openings of the photo-taking lens is symmetrical with respect to the optical axis. Even in the case of the line sensors not containing the optical axis, the above discussion can equally apply provided that the line sensors, the separator lenses and the aperture masks are arranged in a direction (sagittal direction) perpendicular to the radius vector direction relative to the optical axis. By way of example, in an alternative embodiment of the present invention as shown in FIG. 8, the line sensors 16a and 16a' are equivalent to each other relative to the vignetting by the photo-taking lens, and so do the line sensors 16b and 16c and the line sensors 16d, 16e and 16f relative to the vignetting of the photo-taking lens, and, even though such the line sensor 16a' and line sensors 16d, 16e and 16f are used, the occurrence of the vignetting can be avoided.

Thus, according to the present invention, since of the plural photoelectric transducer element arrays having different positions and directions some are disposed in the horizontal position which contains the optical axis and the remaining are disposed in the vertical position which does not contain the optical axis, the focus detection in the horizontal and vertical directions can be accomplished simultaneously and, at the same time, the automatic focus detection in the horizontal direction can also be accomplished. Therefore, with the system according to the present invention, the probability that any of a variety of objects to be photographed is properly focused can be substantially increased.

Moreover, so far as the photoelectric transducer element arrays which do not contain the optical axis are concerned, they are disposed in such an arrangement where the focus detecting light fluxes in any of various interchangeable lenses will not be easily vignetted. Even though they are vignetted, the standard and reference light fluxes are equally vignetted without centers thereof being affected, and, therefore, the plural distance measurements can be achieved with high focusing accuracy.

Although the present invention has been fully described in connection with the preferred embodiments with reference to the accompanying drawings, it is to be noted that various changes and modifications are apparent to those skilled in the art. Such changes and modifications are to be understood as included within the scope of the present invention as defined by the appended claims unless they depart therefrom.

What is claimed:

1. A focus detecting system oomprising:
   a first light receiving means, including a first pair of photoelectric arrays, for receiving light passed through a pair of first portions defined in an exit pupil of a photo-taking lens, said first pair of photoelectric arrays corresponding to an axial focus detecting area extended in a first direction on a photo-taking field;
   a second light receiving means, including at least a second pair of photoelectric arrays, for receiving light passed through a pair of second portions defined in an exit pupil of the photo-taking lens, said second pair of photo-electric arrays corresponding to an off-axis focus detecting extended in a second direction on a photo-taking field, and said second direction being perpendicular to an imaginary line connecting the optical axis of the photo-taking lens with the off-axis focus detecting area and not being parallel to said first direction; and
   means for calculating the focusing condition of the photo-taking lens on the basis of a plurality of outputs of the first and second light receiving means.

2. The focus detecting system as claimed in claim 1, wherein the second direction is perpendicular to the first direction.

3. The focus detecting system as claimed in claim 2, wherein the second light receiving means includes a plurality of pairs of photoelectric arrays corresponding to a plurality of off-axis focus detecting areas extended in the second direction on the photo-taking field. This application is a continuation of application Ser. No. 065,904, filed June 24, 1987, now abandoned.

* * * * *